UNITED STATES PATENT OFFICE.

JULIUS SCHLINCK, OF HAMBURG, GERMANY.

PROCESS FOR EMULSIFYING FATS AND FATTY SUBSTANCES.

1,220,010.  Specification of Letters Patent.  Patented Mar. 20, 1917.

No Drawing.  Application filed August 12, 1916. Serial No. 114,631.

*To all whom it may concern:*

Be it known that I, Dr. JULIUS SCHLINCK, a subject of the German Emperor, residing at Hamburg-on-the-Elbe, in the Empire of Germany, have invented certain new and useful Improvements in Processes for Emulsifying Fats and Fatty Substances, of which the following is a specification.

Aqueous ointments are produced by thoroughly mixing by stirring water or aqueous liquid in fats or fatty substances. The capacity for absorbing water in such a connection is limited. As distinguished from ointments, emulsions are produced by thoroughly mixing fats or fatty substances in water or aqueous liquid. The binding or union between water or aqueous liquid on the one hand and fats and fatty substances on the other hand is therefore entirely different as regards emulsions from the binding of the same in water containing fat, while further, the properties of both compositions are entirely different. An aqueous ointment has a fatty nature; it is not wetted by water; and the water can be separated out of it by melting and by a sufficient addition of readily soluble salts. Emulsions are miscible with any desired quantities of water or aqueous liquid. Salts which do not produce any changes in the materials of emulsions, likewise do not interfere with the distribution of the fat in the aqueous liquid.

It is well known that the incorporation of water in the fat or in fatty substances can be facilitated by the addition of certain agents. For example, water can be more readily mixed in large quantities, and more easily in fats, for instance, in lard, if small quantities of borax are added to the water. It is also well known that the addition of large quantities of cholesterins (cholesterin or bodies similar to cholesterin) or oxy-cholesterins increases the capacity of fat or fatty substance to absorb water. It was not previously known whether those substances which facilitate the miscibility of water with fats in the manufacture of ointments, have also the property of promoting the miscibility of fat in water or aqueous liquid in the manufacture of emulsions.

The inventor has now discovered that an addition of comparatively small quantities of cholesterins or oxy-cholesterins not only increases the capacity of the fat for emulsifying, that is to say, the more ready miscibility of the fat in water or aqueous liquid, but has also the result that under certain conditions this method will produce extremely permanent emulsions which can withstand protracted heating, for instance evaporation or concentration, without injury. This discovery forms the basis of the process for emulsifying fatty substances which constitutes the subject matter of the present invention. The said process consists in adding to the fats or fatty substances which are naturally free from cholesterin or only contain a small percentage of such matters, a quantity of cholesterins or oxy-cholesterins that will be sufficient to allow of using these mixtures for the manufacture of emulsions. As the emulsifying liquid there may be employed any aqueous liquid that contains albumins, including casein in the dissolved or swelled condition. Skim-milk is particularly suitable. The addition of cholesterin, calculated on the amount of fat, is about 0.1 to 0.4%. It may be less in the case of fats which are readily emulsified, and it may be correspondingly increased in the case of fatty substances which are very difficult to emulsify. On the addition of these small quantities of cholesterin bodies, amounting as a rule from 0.1 to 0.2%, the fat or the fatty substance is treated with the aqueous liquid in emulsifying apparatus of known kind. Milklike products are thereby produced in which the fat may be mixed in a better degree than it is in milk or cream. The milklike or creamlike liquids may be boiled without the fat separating out therefrom.

The following is an example of one way of carrying out the improved process:

0.15 kilograms of pure oxy-cholesterin is added to 100 kgs. of melted cocoanut butter. The fat is then allowed to flow slowly and in a uniform stream into a mixing apparatus into which skim-milk is allowed to flow at the same time, and in the proportion of 900 liters of skim-milk to the total quantity of this oxy-cholesterin-containing fat. The uniform mixture then flows onward to an emulsifying apparatus which is so adjusted as to discharge finished creamlike liquid containing the fat in the desired state of subdivision.

The applicant has discovered that according to this process, with the use of skim-milk and a mixture of fat which is as neutral as possible and has a melting point between 26 to 36° C., for instance, a mixture of cocoa fat and fats of higher boiling points, a product can be obtained which according to its content in fat, is so similar to cream or to cow's milk that it constitutes an excellent substitute for the same, not only as regards nutritive value but also as regards taste and flavor. With the addition of some sugar and also if desired of food salts, the resulting creamlike or milklike liquid can be condensed like cow's milk into a uniform extract in which the fat remains in a state of extreme fine subdivision, so that when diluted with water it will produce a perfectly uniform creamlike or milklike liquid. When fats are used having a boiling point of about 26° or higher the flavor of the oil is not so apparent in the milklike liquid. When fats are used having melting points above 36°, and the product has stood for some time, the said product leaves upon the tongue a fine-sandy, rough feeling. For this reason it is admissible to restrict the melting point of the fat or mixture of fats between 26° and 36° when intended for the manufacture of milklike foods.

According to this improved process for emulsifying fats, milklike or creamlike liquids may be produced for various industrial purposes, for instance, for tanneries, for pharmacy, and the like. The respective fat or fatty substance is treated in the fluid state likewise in heat with the albuminous liquid in emulsifying devices in the manner stated.

It has already been proposed to produce an emulsion from skim-milk and codliver oil to serve as a food for children (German Patent print No. 121,230). Codliver oil contains about 2% of cholesterins. However in the case of codliver oil this natural content of cholesterins has not the effect of producing really permanent emulsions, because the fat of codliver oil occupies an exceptional position as regards milklike subdivision. It was not hitherto known that the natural content of cholesterins in codliver oil increased the emulsifying property of codliver oil fat. It was also not known how to utilize the cholesterins contained in codliver oil fat for the purpose of affecting a thorough milklike subdivision of the codliver oil fat, for which purpose according to the present invention, the addition of cholesterins is made to fats and oils which are free from cholesterins or poor in cholesterins. Sesame oil or poppy oil to which 0.2 to 0.4% of cholesterin or cholesterinlike substances is added, is more readily converted into the form of a permanent emulsion which can be heated and concentrated without injury, than codliver oil which contains a considerably higher percentage of cholesterins.

In contradistinction to the known processes for producing emulsions of codliver oil it is important according to this invention, that any fat which is poor in cholesterin, such as the animal food fats, and which consequently does not produce a good permanent emulsion, as also fats which are free from cholesterin, such as vegetable oils and vegetable fats or fat-like substances, shall be worked up into the form of very permanent emulsions with the addition of small amounts of cholesterins.

For the purpose of producing an aromatic fermented milk intended for use for the manufacture of margarin emulsion, it has already been proposed in German Patent 127,376 to add an ether-alcohol solution of cholesterin to the milk. In the usual acid fermentation of such milk there are produced particular aromatic cholesterin combinations which impart a butter-like roasted flavor to margarins made by means of such fermented milk. This known mode of use of the addition of milk is not however intended to, and does not produce a milklike and creamlike subdivision of the fat.

I claim:—

1. A process of producing stable emulsions of fatty materials with liquids containing albumin which comprises thoroughly mixing together, a fat poor in cholesterin, a liquid containing albumin, and cholesterin.

2. A process of producing stable emulsions which comprises thoroughly mixing together, a fatty material poor in cholesterin and having a melting point between about 26° C., and about 36° C., skim-milk and about .1 to .4% of cholesterin.

In testimony whereof I affix my signature in presence of two witnesses.

Dr. JULIUS SCHLINCK.

Witnesses:
 Francis R. Stewart,
 Louis F. Dilger.